US012340422B1

(12) United States Patent
Meyer et al.

(10) Patent No.: US 12,340,422 B1
(45) Date of Patent: *Jun. 24, 2025

(54) SYSTEM AND METHOD FOR EMERGENCY RELEASE OF FUNDS

(71) Applicant: UIPCO, LLC, San Antonio, TX (US)

(72) Inventors: Gregory Brian Meyer, San Antonio, TX (US); Yevgeniy Viatcheslavovich Khmelev, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,263

(22) Filed: Jul. 31, 2023

Related U.S. Application Data

(63) Continuation of application No. 17/514,372, filed on Oct. 29, 2021, now Pat. No. 11,810,200.

(60) Provisional application No. 63/238,887, filed on Aug. 31, 2021.

(51) Int. Cl.
| *G06Q 40/08* | (2012.01) |
| *G01V 1/01* | (2024.01) |
| *G01W 1/10* | (2006.01) |
| *G06N 7/01* | (2023.01) |
| *G06Q 20/38* | (2012.01) |

(Continued)

(52) U.S. Cl.
CPC ............... *G06Q 40/08* (2013.01); *G01V 1/01* (2024.01); *G01W 1/10* (2013.01); *G06N 7/01* (2023.01); *G06Q 20/389* (2013.01); *G06Q 40/02* (2013.01); *G06Q 50/26* (2013.01)

(58) Field of Classification Search
CPC ...... G06Q 40/08; G06Q 20/389; G06Q 40/02; G06Q 50/26; G01V 1/01; G01W 1/10; G06N 7/01
USPC ....................................... 705/3–44
See application file for complete search history.

(56) References Cited

U.S. PATENT DOCUMENTS

| 7,058,710 B2 | 6/2006 | McCall |
| 8,620,841 B1 * | 12/2013 | Filson ................. H04L 12/1895 |
| | | 706/12 |
| 8,655,806 B2 | 2/2014 | Jung |

(Continued)

FOREIGN PATENT DOCUMENTS

| CH | 712882 A2 * | 3/2018 | .............. G01W 1/10 |
| WO | WO-0008567 A1 | 2/2000 | |
| WO | WO-2011091818 A2 | 8/2011 | |

OTHER PUBLICATIONS

Non-Final Office Action mailed Mar. 30, 2023 for U.S. Appl. No. 17/514,372.

(Continued)

*Primary Examiner* — Christopher Bridges
(74) *Attorney, Agent, or Firm* — Plumsea Law Group, LLC

(57) ABSTRACT

A method and system for improving and automating the identification of homes located in an imminent or current disaster zone and causing an immediate release of funds to residents without requiring the insured member to first submit a claim are disclosed. The system and method are configured to determine whether there is a high likelihood of a disaster event occurring in a region, based on external sources or local device sensors. In response to the disaster event, a smart contract is executed such that funds are expeditiously released via a distributed ledger system to insured members in the first region.

20 Claims, 7 Drawing Sheets

(51) Int. Cl.
*G06Q 40/02* (2023.01)
*G06Q 50/26* (2012.01)

(56) References Cited

U.S. PATENT DOCUMENTS

| | | | |
|---|---|---|---|
| 9,656,606 | B1 | 5/2017 | Vose |
| 9,892,463 | B1 * | 2/2018 | Hakimi-Boushehri ..................... G06Q 50/16 |
| 9,984,417 | B1 * | 5/2018 | Allen ..................... G06Q 40/08 |
| 10,475,127 | B1 | 11/2019 | Potter |
| 10,488,556 | B2 | 11/2019 | Kodra |
| 11,022,672 | B1 | 6/2021 | Chartier |
| 11,087,403 | B2 | 8/2021 | Crabtree |
| 11,392,897 | B1 | 7/2022 | Gingrich |
| 11,400,324 | B2 * | 8/2022 | Conboy ................ A62C 3/0228 |
| 11,989,780 | B2 * | 5/2024 | Regmi ................... G06Q 40/02 |
| 2007/0174095 | A1 * | 7/2007 | McComb ............... G06Q 40/08 705/4 |
| 2014/0132409 | A1 | 5/2014 | Billman |
| 2014/0257864 | A1 | 9/2014 | Billman |
| 2017/0308421 | A1 * | 10/2017 | Angeles .............. G06F 11/0709 |
| 2019/0114714 | A1 * | 4/2019 | Jones ................... H04W 4/026 |

OTHER PUBLICATIONS

Notice of Allowance mailed Jun. 20, 2023 for U.S. Appl. No. 17/514,372.

Thistlethwaite et al., "Barriers to Insurance as a Flood Risk Management Tool: Evidence from a survey of Property Owners", In. J. disaster Risk Sci (2020) 11 :263-273, May 4 (Year: 2020).

* cited by examiner

SYSTEM AND METHOD FOR EMERGENCY RELEASE OF FUNDS

CROSS-REFERENCE TO RELATED APPLICATION

This application claims the benefit of U.S. Provisional Patent Application Ser. No. 63/238,887 filed on Aug. 31, 2021 and titled "System and Method for Emergency Release of Funds", and U.S. patent application Ser. No. 17/514,372, filed on Oct. 29, 2021 and titled "System and Method for Emergency Release of Funds", the disclosures of which are incorporated by reference herein in their entirety.

TECHNICAL FIELD

The present disclosure generally relates to methods and systems for providing relief during a disaster, and specifically to managing emergency transactions, using one or more blockchains, to provide persons in disaster-impacted regions with the necessary funds to facilitate the recovery process.

BACKGROUND

Following disasters such as floods, hurricanes, fires, and tornadoes, entities that insure properties in the disaster area typically need to communicate with insured members and conduct surveys to assess any damage that has impacted one or more insured properties. However, obtaining further information regarding the extent of such damage has remained a time-consuming and resource intensive task, typically requiring a human agent to visit the structure in person to more closely examine the effects of the disaster. Even when such examinations are necessary, local environmental conditions following a disaster can prevent access to the structure for several days or weeks. This process can lead to delays for homeowners and other insured entities in receiving much needed relief or support. The ability to quickly and accurately detect when a disaster may strike a particular region and determine whether residents of that area will require assistance is highly desirable. For example, in response to such events, having immediate access to funds can often directly and powerfully affect the lives of those impacted. However, residents of the associated disaster area are often forced to evacuate their homes. This makes delivering critical assistance to these residents difficult, since the funds may not be readily available through normal channels.

There is a need in the art for a system and method that addresses the shortcomings discussed above.

SUMMARY

In one aspect, a method of releasing funds in response to emergency conditions is disclosed. The method includes a first step of receiving, at a computing device, a first dataset including an environmental disaster forecast, and a second step of determining, at the computing device and based on the first dataset, there is a high likelihood of an impending disaster event impacting a first region. A third step includes classifying, at the computing device and based on the first dataset, the disaster event as being of a first disaster type, and a fourth step includes determining, at the computing device, the classification satisfies a required first condition for a smart contract previously established on behalf of a first person residing in the first region. The method further includes a fifth step of sending, from the computing device and in response to the first condition being satisfied, an authorization signal to a distributed ledger system in which a predefined blockchain-based asset is managed, the signal triggering a payout of the asset to at least the first person residing in the first region.

In another aspect, a method of releasing funds in response to emergency conditions is also disclosed, including a first step of receiving, at a first application running on a computing device for a first user, sensor data indicating the computing device is in a location in which a disaster event has recently occurred, and a second step of classifying, at the first application and based on the sensor data, the disaster event as being of a first disaster type. A third step includes determining, at the first application, that the classification satisfies a required first condition for a smart contract previously established on behalf of the first user, and a fourth step includes authorizing, via the first application and in response to the first condition being satisfied, a first payout to the first user via a distributed ledger system in which predefined blockchain-based funds are managed.

In another aspect, a system for facilitating customer support experiences includes a processor and machine-readable media including instructions which, when executed by the processor, cause the processor to receive, at a computing device, a first dataset including an environmental disaster forecast and to determine, at the computing device and based on the first dataset, there is a high likelihood of an impending disaster event impacting a first region. The instructions further cause the processor to classify, at the computing device and based on the first dataset, the disaster event as being of a first disaster type, and to determine, at the computing device, the classification satisfies a required first condition for a smart contract previously established on behalf of a first person residing in the first region. Furthermore, the instructions cause the processor to send, from the computing device and in response to the first condition being satisfied, an authorization signal to a distributed ledger system in which a predefined blockchain-based asset is managed, the signal triggering a payout of the asset to at least the first person residing in the first region.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
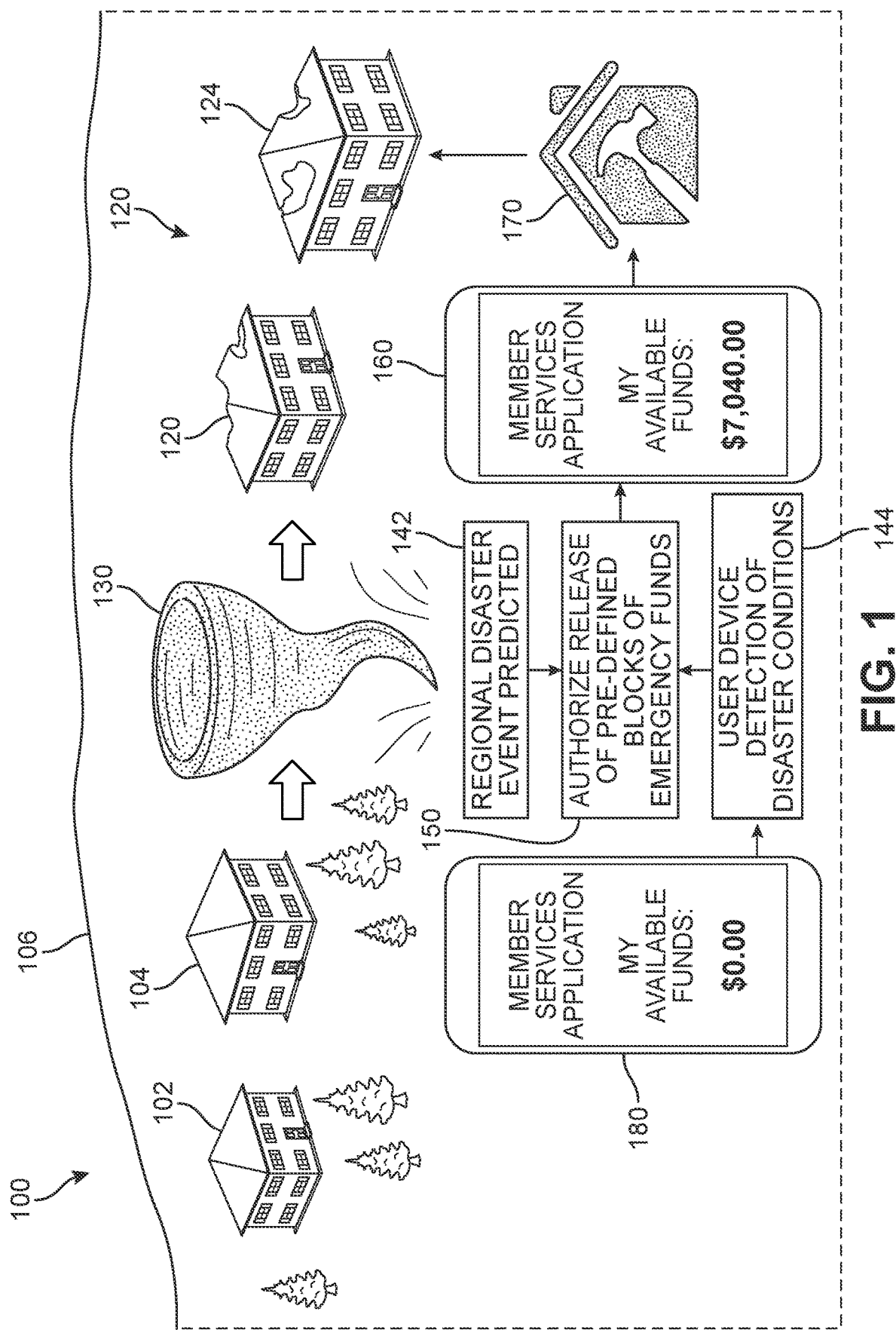
FIG. 1 depicts an overview of a scenario in which an environmental disaster occurs and triggers a release of funds based on detection of either a local weather forecast or local mobile device sensor data, according to an embodiment.

The embodiments provide a system and method for improving and automating the identification of homes located in an imminent or current disaster zone and immediately releasing relief funds to residents without requiring the insured member to first submit a claim. Conventionally, insurance claims following an environmental emergency must be created by the insured members, submitted to the insurance carrier's intake mechanism, processed, and approved before these funds can be made available to the member. Using conventional methods, an insured resident of a building impacted by a disaster are at the mercy of the insurer's processing timeline. In some cases, the disaster may prevent the member from access to communication channels (e.g., telephone and/or internet) through which to submit a claim, or the member may be otherwise unable to immediately submit a claim due to the damage caused to their property, further delaying their access to the funds.

In contrast, the embodiments provide methods and systems for automating and expediting claims processing of insured residents in areas that experience disaster conditions. The system applies an artificial intelligence (AI) engine to determine approximate losses with the appropriate payouts based on each type of disaster and the degree of severity of such an event. Smart contracts are then generated to preauthorize payments to certain affected areas and to members located in those areas using this information. The funds will be automatically released in response to the detection of a predefined emergency (as determined by the system based on data about and/or from the region) in certain geographic locations. In some embodiments, disaster conditions can be automatically detected on a mobile device without internet access to fulfill smart contact conditions while offline.

As one non-limiting example, as a disaster is approaching (for example, a hurricane), the system may be configured to determine which geographical locations would likely be affected by the upcoming disaster. The system could also determine an overall amount to distribute or make available to the members in the disaster zone based on one or more of: (a) prior disasters, (b) density of members in the zone, (c) property values, and/or (d) prior claims settlement information. Some of these funds could be made immediately available. In different embodiments, these funds can be associated with blocks in a cryptocurrency or blockchain, and would effectively become pre-positioned block chain payments in a disaster zone.

In another example, members would have mobile devices on which a specific emergency relief application ("app") is loaded. In some embodiments, the features offered by the proposed app can be integrated into an insurer's existing app. In a worst-case type scenario, where mobile data and internet infrastructure have been destroyed by the natural disaster, the app would include provisions for enabling and permitting access to these emergency funds without the need for internet access. Instead, embodiments of the system would rely on the existing capabilities of smart phones to determine whether the user is located in the affected disaster area to validate the access to the emergency funds.

As will be discussed in detail below, different embodiments may rely on different detected conditions to determine whether a location is situated within a disaster zone. In one embodiment, the insured's mobile device 'listens' for an emergency broadcast message. This could occur, for example, via a microphone input including a particular type of radio broadcast signal or, if the mobile device includes an AM/FM tuner, listening to an emergency channel on the radio tuner. In another embodiment, G-force sensors or accelerometers may be used to determine that the mobile device was recently in an earthquake zone. In another embodiment, the mobile device can detect the existence of an emergency Wi-Fi router name, ID or other identifiable information. These types of sensed conditions can be used to fulfill terms of a smart contract that would automatically trigger a release of or allow access to funds by the mobile device.

As a general matter, the proposed systems incorporate the functionality of electronic interchange systems for managing transactions. In some embodiments, the interchange system employs blockchain elements that can be used in a payment apparatus for managing payments or other types of transactions, and for managing user accounts. The interchange system enables users to enroll in the system, and enables the various users' computing devices to be used as confirmation centers for new transactions and/or funds transfers between users. The system also provides a payment gateway and/or exchange base between digital currency users and other entities such as merchants, vendors, service-providers, and/or other parties that may use other types of currency (e.g., government-provided currency). In some implementations, the system includes a centralized server and/or cluster of servers that provide blockchain currency miners. User device(s) may also provide blockchain currency miners, in addition to or instead of the server device(s). The currency miners may enable the management of the ledger of transactions and/or transfers of digital currency coins between digital and physical payment apparatuses and/or other financial entities. Miners provide verification by submitting mathematical proofs and are rewarded with transaction fees and/or newly generated crypto-currency (e.g., coins) according to the protocol being employed. Miners record the ledger (e.g., blocks) to the blockchain and, in at least some instances, the network is self-managed.

In some embodiments, the interchange system may enable users to make transfers of confirmed blockchain digital currency coins (also described as coins) in a secure ecosystem, to reduce or eliminate the risk of infiltration by outside networks, and to enable secure digital transactions. In this way, the system allows entities (e.g., companies, financial institutions) to increase their trust product through the use of secure elements in a physical device such as a smartphone, the token device described below, or other suitable type of secure element container that generates transaction messages, sends blockchain requests, and requests the confirmation of digital currency coin transaction logging in the interchange system.

A blockchain is an immutable public ledger of all transactions that have ever been executed in one or more contexts (e.g., negotiable instrument transactions, digital currency transactions, funds transfers, etc.). A blockchain grows as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

In general, a smart contract may include executable code that is configured to access the treasury accounts on a distributed ledger system, as well as the various external systems (e.g., institutional systems) of the institutions participating in the distributed ledger-based interchange system. The smart contract(s) may be on the distributed ledger system or may be external to the distributed ledger system.

A number of examples will be provided related to assets, digital assets, Bitcoins, Dogecoin, Litecoin, Ethereum, or other digital currencies that exist or will be created/mined in the future, and/or other types of electronically transferable assets with respect to an insurance claim "payout" or other release of funds. However, it is specifically noted that the concepts apply to any type of blockchain asset or traditional assets such as stock equities, bonds, commodities, real estate, insurance contracts, legal contracts, dollars, etc. Using the proposed technology, parties do not need to rely on manually prepared agreements and/or services of third-party mediators (e.g., financial brokers, agents, lawyers) to secure an agreement for access to resources and capital, all of which are costly, time-consuming and/or susceptible to errors and data security breaches. It can be appreciated that implementations of the techniques and technologies described herein may include the use of solid-state circuits, digital logic circuits, computer components, and/or software executing on one or more input devices. Signals described herein may include analog and/or digital signals for communicating a changed state of auction data, release of funds from the blockchain, or other information pertaining to the transaction data blockchain.

For purposes of clarity, an overview of one embodiment of the proposed systems and methods is illustrated with reference to FIG. 1. In FIG. 1, an example of an implementation of the proposed system is shown as executed via a first mobile computing device ("first device") 180 that includes a local funding system or is in communication with a remote funding system. In different embodiments, an area 100 may include various structures, such as a first residence 102 and a second residence 104. As used herein, the term "building" or "structure" can refer to any kind of building, such as a home, or other residential building, a shed, barn, a commercial building or any other related structures. A building typically can include a roof, room, walls, support structures, windows, or other features. In some cases, the primary structure can be associated with additional secondary structures, features, or property that may be disposed adjacent to or otherwise near the primary structure. In FIG. 1, the residences (102, 104) are shown in an undamaged state 106 before the tornado 130 and a subsequent damaged state 120 following the impact of the tornado 130.

As noted above, in different embodiments, the proposed systems enable insured parties to obtain payout or otherwise cause transactions to be executed via an electronic interchange. As a general matter, an insured party or member refers to the policyholder or other beneficiary of a claim through their insurance company. In some embodiments, the first device 180 is configured to capture sensor data of a surrounding area 100. The sensor data is provided to the local and/or remote instance of the funding system. As an emergency situation (shown here as a tornado 130) approaches or occurs at area 100, the sensor data can detect one or more conditions that may be used to determine that user emergency conditions are being detected 144, which can trigger an automated release of funds 150 at the local and/or remote funding system. This can occur with or without a connection to a communication network. Alternatively, in some embodiments, the local and/or remote funding system can be in communication with external data service providers (e.g., weather reports) over a communication network that may also trigger the automated release of funds 150 when a regional disaster event is predicted 142. Once the funds are released, the user will have immediate access via first device 180 (for example, through an app 160 running on the device) which can be used to initiate repair operations 170 or otherwise support the member during and after the crisis.

In general, a communication network may comprise a traditional wired network and/or a wireless network usable by portable devices such as portable computers, smartphones, etc. Therefore, policy holders may interact with the system by operating mobile devices such as a portable client computer, tablet, wireless telephone (such as a smartphone) and/or other devices capable of communicating with communication network or communication module. The mobile device may communicate with the insurance claim processing system over a wireless connection with a cellular or internet data routing system, such as a WiFi, 3G, 4G, or 5G network. In one embodiment, the first device 180 may have web browsing capabilities such that communication with a funding module may be made over a standard web interface. Alternatively, or concurrently, the first device 180 employed by a policyholder to communicate with the system may incorporate a series of instructions for interacting with the system. For example, in one embodiment first device 180 may include a downloaded program or applet that allows the policy holder to access his or her specific insurance policy account(s) while offline or while connected to the system. In some embodiments, the first device 180 can also include a separate or integrated mobile device application 160 that may include a sensor widget having any necessary libraries or data to work with the sensor data being obtained by sensors of first device 180. In the discussion below, it is assumed that the policy holder already has a policy with the insurance company that uses the insurance claim processing systems described herein.

Figure 2:
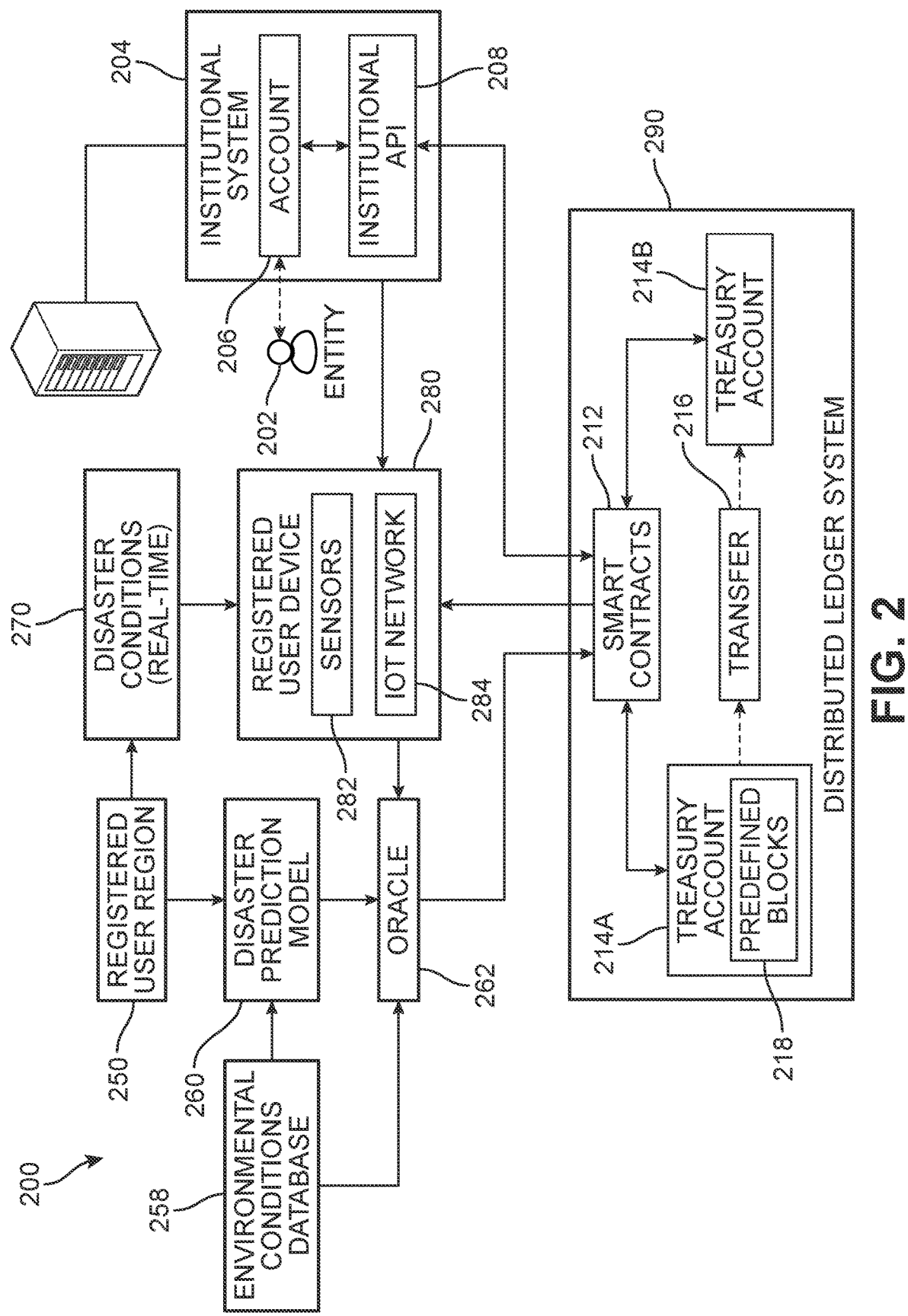
FIG. 2 is an overview of an architecture of a smart contract management system, according to an embodiment.

Referring now to FIG. 2, a claim processing architecture 200 incorporating and/or utilizing an electronic interchange and smart contract system ("distributed ledger system" or simply "blockchain system") 290 is illustrated. As noted above, the proposed embodiments disclose two separate processes that may be implemented to perform the automated release of emergency funds via the blockchain. In a first process, a registered policyholder (insured) entity 202 may be understood to be located or reside in a user region 250. If an emergency condition (e.g., hurricane, wildfire, act of war, terrorist attacks, disease outbreak, tornado, volcanic eruption, flood, earthquake, storm (wind, rain, and/or snow), drought, etc.) is likely to occur (or predicted by an optional disaster prediction model 260 for region 250), one or more smart contracts 212 for members located in region 250 can be engaged, depending in part on the terms and conditions (see FIG. 3) that have been integrated into the contract. In some embodiments, the model 260 and/or an oracle module 262 are in communication with an environmental conditions database 258 (e.g., weather reports, environmental disaster agencies, sensors in the region, etc.) that provides real-time updates regarding the region's status.

If there is a policyholder who has enrolled in the smart contract-based claim process located in region 250 at the time the prediction is generated, an electronic work-file for a claim based on the predicted disaster may be automatically established by the blockchain system 290 using information already contained in their smart contract, which may include and/or be configured to operate within parameters established by member data, claim rules, policy information, or other data. In different embodiments, an oracle module 262 is configured to collect such data, as well as other information related to terms and conditions for each smart contract, in order to ensure the system 290 can verify real-world occurrences or events. For example, the oracle 262 can refer to a service that provides a data feed to the smart contracts 212 and could also provide a unique key as well. The oracle 212 can be a virtual machine or human agent that finds and verifies real-world occurrences or events and submits this information to one or more of the distributed ledger system 290 and/or the system to be used by the smart contracts. The oracle 262 can receive the data and format it or modify it in preparation for providing or submitting to the blockchain smart contract.

It is to be understood that a wide variety of oracles may be utilized (e.g., stock exchanges, GPS data providers, date/time providers, crowdsourced decentralized data providers, news providers, activity monitors, RSS feeds, other oracles, etc.). In various embodiments, RSS feeds may be from sensor-based devices such as a mobile phone (e.g., with data from many such devices aggregated into a feed), may be social network (e.g., Twitter, Facebook) or news feeds (e.g., which may be further filtered down by various parameters), may be market data feeds and/or the like feeds. In one example, the smart contract is configured to communicate with an oracle that is configured to make a request to obtain a particular feed's data stream.

As noted earlier, smart contracts contain value and only unlock that value if certain predefined conditions are met. When a particular value is reached, the smart contract changes its state and executes the programmatically pre-defined algorithms, automatically triggering an event on the blockchain. The primary task of oracles 262 is then to provide these values to the smart contract in a secure and trusted manner. Blockchains will not typically access data outside their network. The oracle 262 can in some cases receive information via a data feed provided by third party service that is designed for use by the smart contract. The oracle 262 will provide the external data and trigger smart contract executions when the pre-defined conditions as described herein are met.

As a general matter, a blockchain may include any number of blocks, 1 through N where N is any number. A block may include, or be associated with a list of transaction(s). The transaction(s) may include the data stored in the blockchain, and each block may store any number of records each indicating when and in what order the transaction(s) are applied to modify the data stored in the blockchain. Each block may also include a pointer that identifies a previous (e.g., or next) block in the blockchain.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to-be-created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

Figure 3:
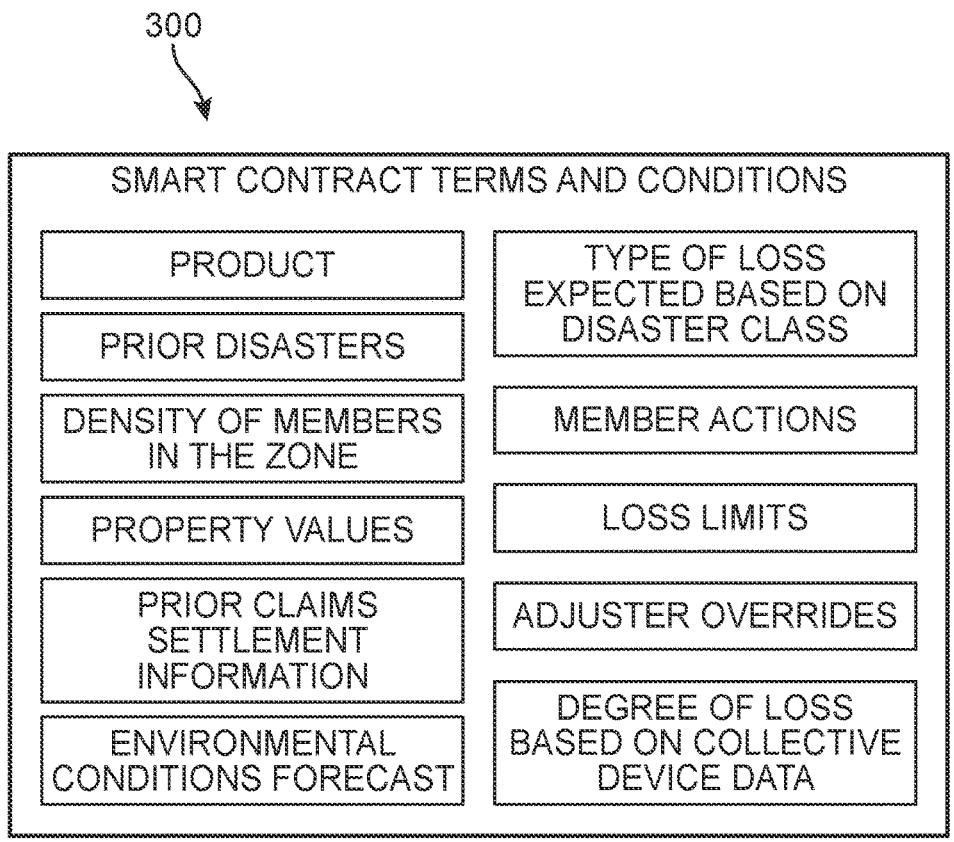
FIG. 3 is a table listing examples of terms and conditions for a smart contract, according to an embodiment.

In different embodiments, conditions that can trigger an execution of a smart contract could be any data like weather temperature, rainfall, member's current location, etc. Referring to FIG. 3, some non-limiting examples of terms and conditions 300 that may be used to determine whether the smart contract for automated claim payout is to be executed and to what extent are listed. Such terms—also referred to herein as payout factors—can include (a) product (i.e., the type of insurance that has been purchased or enrolled in), (b) prior disasters (i.e., whether the region has experienced previous disasters, and their type/intensity), (c) density of members in the region (i.e., how many members will be seeking payout), (d) property values (i.e., to determine the size of the payout), (e) prior claims settlement information (i.e., has this member previously filed claims), (f) the type of loss expected in this case based on the disaster type and class (i.e., to determine the size of the payout), (g) member actions (i.e., whether the member has requested or initiated a claim, whether the member has performed a pre-required task regarding their home such as installation of shutters, etc.), (h) loss limits (based on the insurance policy itself), (i) adjuster overrides, (j) environmental conditions forecasted (or current/real-time), and/or (k) degree of loss based on collected user device data. Thus, returning to FIG. 2, the smart contract 212 can be configured to execute when one or more preset conditions have been met. For purposes of the present embodiments, a smart contract term may typically include the detection of environmental conditions, such as (1) a flood warning for the region has been issued in the last 24 hours (or other window of time); (2) a category 3+ hurricane is imminent for the region; (3) wildfires approaching the region; (4) evacuation orders issued by an official for the region; (5) a tsunami warning for the region has been issued in the last 24 hours (or other window of time); (6) temperature is above 102 degrees for longer than 48 hours (or other window of time), etc. It should be understood that this list is provided for illustrative purposes only, and any other environmental condition may be used to cause the execution of a smart contract. In addition, in different embodiments, the system is configured to receive oracle information and determine whether there is a high likelihood of a disaster event occurring, and classifying the type of disaster event it is (based on pre-defined categories). In some embodiments, further sub-classifications can be determined by the system based on the level or degree of severity that has been assigned to the event.

In some embodiments, the smart contract may take actions (e.g., transfer assets, transfer collateral) based on data provided by one or more oracles. These data can be understood to serve as implicit claims that are generated automatically on behalf of the members in the region 250 when certain environmental conditions occur or are predicted. In one embodiment, contract terms may include a specification of the value of an asset based on data provided by an oracle. In another embodiment, contract terms may include a specification of an action to take based on weather and/or the like (e.g., natural events such as flood, earthquake, volcanic eruption, lava flow; political events such as political unrest, war, terrorist attacks) conditions based on data provided by an oracle. In another embodiment, contract terms may include another smart contract (e.g., that acts as an oracle) resulting in a cascading smart contract. For example, a crowdsourced decentralized weather provider oracle may obtain (e.g., from smartphones of participating users) crowdsourced weather data (e.g., temperature, rainfall, humidity), and provide such (e.g., combined) weather data for the smart contract. The smart contract may specify that an order to trigger the release of the block if the crowdsourced weather data matches specifications. In another example, a crowdsourced decentralized usage tracking provider oracle may obtain (e.g., from smartphones of participating users) crowdsourced usage data (e.g., via social media services people utilize), and provide such data (e.g., local residents discussing an impending disaster to trigger the release of funds for a member in the region.

In different embodiments, the transaction can be stored in a virtual ledger such as a blockchain. In other words, in some embodiments, the distributed ledger system is or comprises one or more blockchains. Accordingly, the distributed ledger system may also be described as a blockchain network. The distributed ledger system may also include one or more smart contracts.

The parties may use a blockchain of the type used to record Bitcoin and other types of transactions and agreements. The recording of information in the ledger could also be for hyperlinks, legal documents, ledgers, identities, regulatory documents, property interests, and the like. The virtual ledger in one example comprises a plurality of encoded blocks. In one example, each block is encoded or hashed such that it incorporates the data in blocks that came before it. In FIG. 2, transfer 216 of predefined blockchain funds 218 from one account to another (214a to 214b) occurs automatically once the terms of the smart contract 212 are fulfilled, creating a transaction event.

In some implementations, the insured's policy may be a smart contract that executes to automatically transfer value to the user in response to detecting an environmental deviation via user device sensors or other oracles. The smart contract may include logic to determine the amount of the value to be transferred under various circumstances, in relation to the various types of deviations. The smart contract may also keep track of payments made by the user (e.g., monthly premiums) to maintain the policy. In some implementations, the operational model for the user device may be stored on a blockchain or other type of distributed ledger. The policy may also be stored on the blockchain. In instances where the policy is implemented as a smart contract, the smart contract may execute on the blockchain.

In one embodiment, the smart contract 212 is also configured to cause the funds to be moved to an external financial provider (institutional system 204) such as a bank or credit union, per the member's instructions. In FIG. 2, member 202 may have an account 206 with an institution such as a bank, credit union, and so forth, while another entity may have an account with another institution or the same institution as member 202. Each institution may operate an institutional system 204. The institutional system may include any appropriate number of type of computing device, such as server computer(s). The member accounts may be maintained on an institutional system for a first institution, and the insurer's accounts may be maintained on an institutional system for a second institution. In some instances, the systems may be node(s) involved in blockchain mining activities as described herein.

In this example, the member 202 maintains an account 206 which is funded by the smart contract through an institutional API 208, thereby processing the 'claim' and releasing the funds to the member 202. It may be appreciated that at no point in this process was a manual input by an agent or other person required that could be associated with a delay in the delivery of the funds. Instead, as soon as the conditions for the smart contract are met, the insured automatically receives the preset payout corresponding to that smart contract. For example, in some embodiments, a signal may be sent to the institutional systems 204 indicating that account of the sending entity may be debited the value of the transaction, and the account of the receiving entity may be credited the value of the transaction. Settlement may occur between the treasury accounts of the sending and receiving institutions, and the treasury accounts present on the distributed ledger system. In the settlement, value may be transferred from the treasury account of the sending institution to the treasury account of the receiving institution. The settlement may be performed in real time with respect to receiving the request for the transaction, with respect to crediting and debiting the receiving and sending entities accounts on the institutions. In some embodiments, each of the institutions participating in the distributed ledger-based interchange system may maintain an amount of funds in their respective treasury account. A number of digital currency coins may be allocated to an institution, such that a value of the allocated coins corresponds to the funds in their treasury account. Settlement may include the transfer of the appropriate number of coins from the sending institution's treasury account to the receiving institution's treasury account. In some implementations, the coins may be assigned a fixed value with respect to another (e.g., non-digital) currency, such as United States Dollars (USDs), Euros, and so forth.

Figure 4:
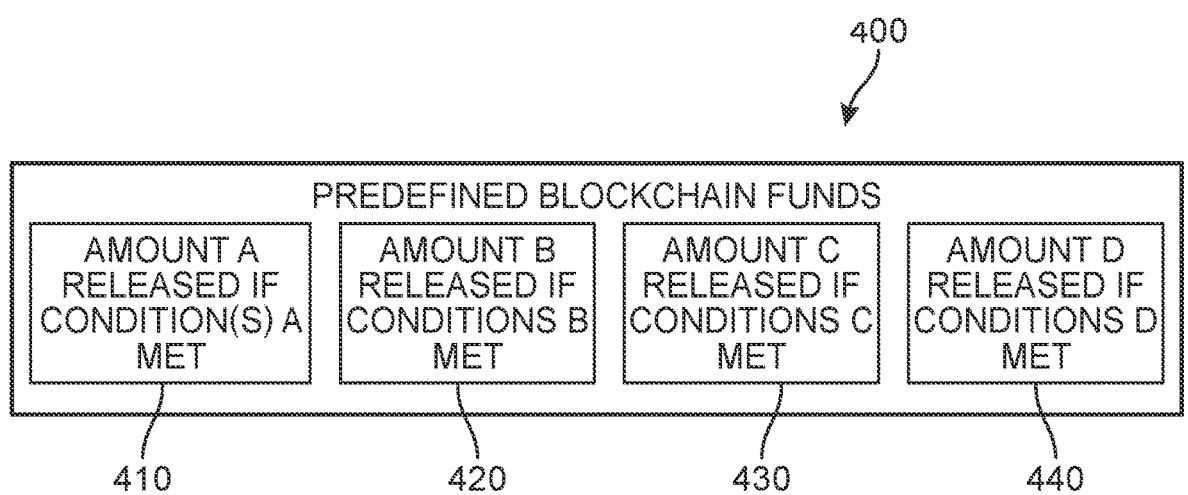
FIG. 4 is an example of predefined blockchain funds established for different end-users, according to an embodiment.

In different embodiments, the smart contracts 212 can be configured to cause different block values to be released in response to the data submitted by oracle 262. An example is presented with reference to FIG. 4, where a series of predefined blockchain funds 400 is depicted. A first block 410 comprises an Amount A that will be released if condition(s) for "A" are met. Similarly, a second block 420 comprises an Amount B that will be released if condition(s) for "B" are met, a third block 430 comprises an Amount C that will be released if condition(s) for "C" are met, and a fourth block 440 comprises an Amount D that will be released if condition(s) for "D" are met. In this example, the amounts A, B, C, and D differ. For example, amount A is less than B, B is less than C, and C is less than D. Thus, the maximum funds that can be released is D, and the least funds that can be released is A. The specific terms that trigger execution of the smart contract for each of these blocks can be understood to differ. For purposes of illustration, the first block 410 can be released via the smart contract terms when a Category 2 hurricane is approaching the region, the second block 420 can be released via the smart contract terms when a Category 3 hurricane is approaching the region, the third block 430 can be released via the smart contract terms when a Category 4 hurricane is approaching the region, and the fourth block 440 can be released via the smart contract terms when a Category 5 hurricane is approaching the region. In other words, in different embodiments, the system can be configured to modulate the amount of funds that will be automatically released based on the (a) type of disaster and (b) intensity of the disaster. In another example, the higher amounts may be released when multiple conditions are detected, such as a flood and an earthquake, while lower amounts are released when only one condition is detected, such as a flood or an earthquake. In different embodiments, the system is configured with preestablished thresholds or levels that can serve as demarcations between different payout amounts.

Figure 6:
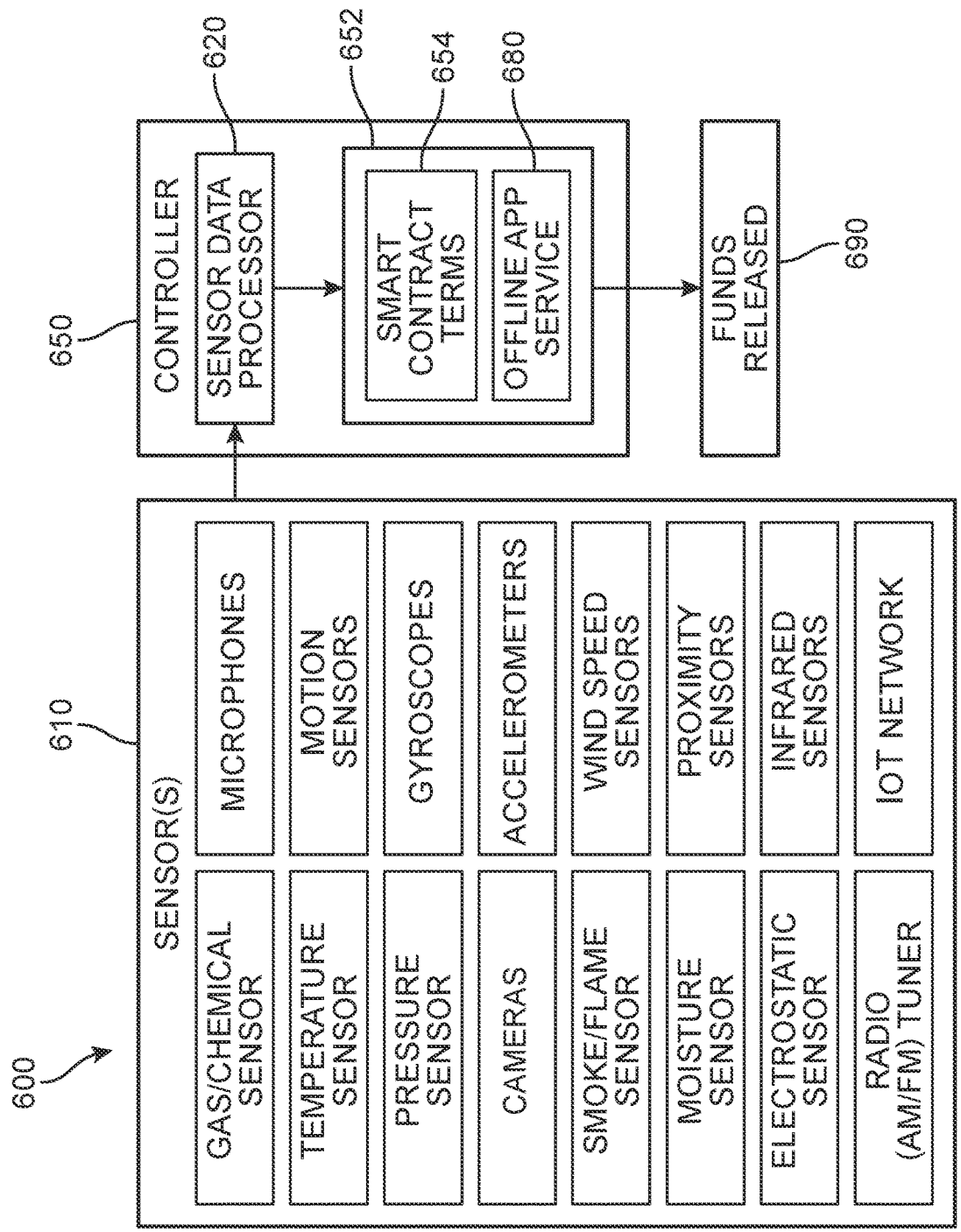
FIG. 6 is a schematic diagram presenting a funds release flow process, according to an embodiment.
Figure 7:
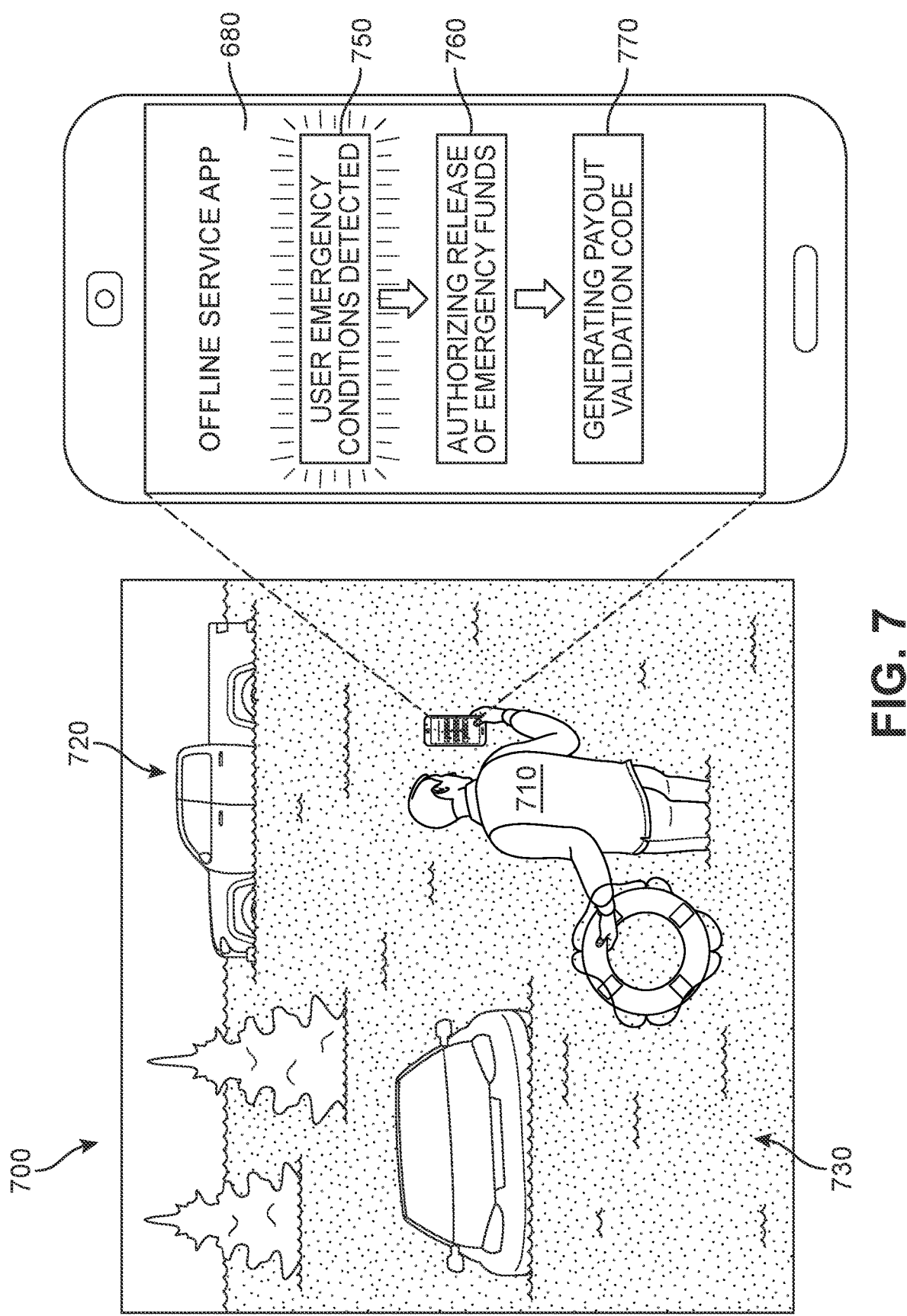
FIG. 7 depicts an example of an end-user experiencing disaster conditions and automatically receiving emergency funds, according to an embodiment.

As noted earlier, the proposed architecture also provides an alternative (offline) process by which funds can be released. Returning to FIG. 2, in different embodiments, a member 202 located in region 250 may experience disaster conditions. In some examples, these conditions may have occurred rapidly (i.e., with little or no warning) such that the disaster prediction model 260 was not able to alert the system 290. In some embodiments, the infrastructure in parts of the region 250 may be down or otherwise unavailable, such that user device 280 is no longer able to communicate with a network. However, the member 202 is still in urgent need of funds to support them in the aftermath of the disaster. As shown in FIG. 2, as disaster conditions 270 around the member 202 occur, sensors 282 and/or locally connected IOT (Internet-Of-Things) devices for the user device 280 can obtain data that corresponds to the disaster. Further details regarding an embodiment of this process are shown in FIGS. 6 and 7. Once the specified smart contract conditions (e.g., as shown FIG. 3) are met based on the received sensor data, an app for the user device 280 can automatically execute the smart contract and cause a release of a predefined block, as described above. The release of these funds will be verified and authorized locally on the user device 280, without a network connection, and allow the member 202 to immediately access the corresponding funds via their device (e.g., as cryptocurrency). It may be appreciated that during emergency conditions, networks may frequently be inaccessible, and such a process can significantly improve the member's ability to recover during a tumultuous time.

Figure 5:
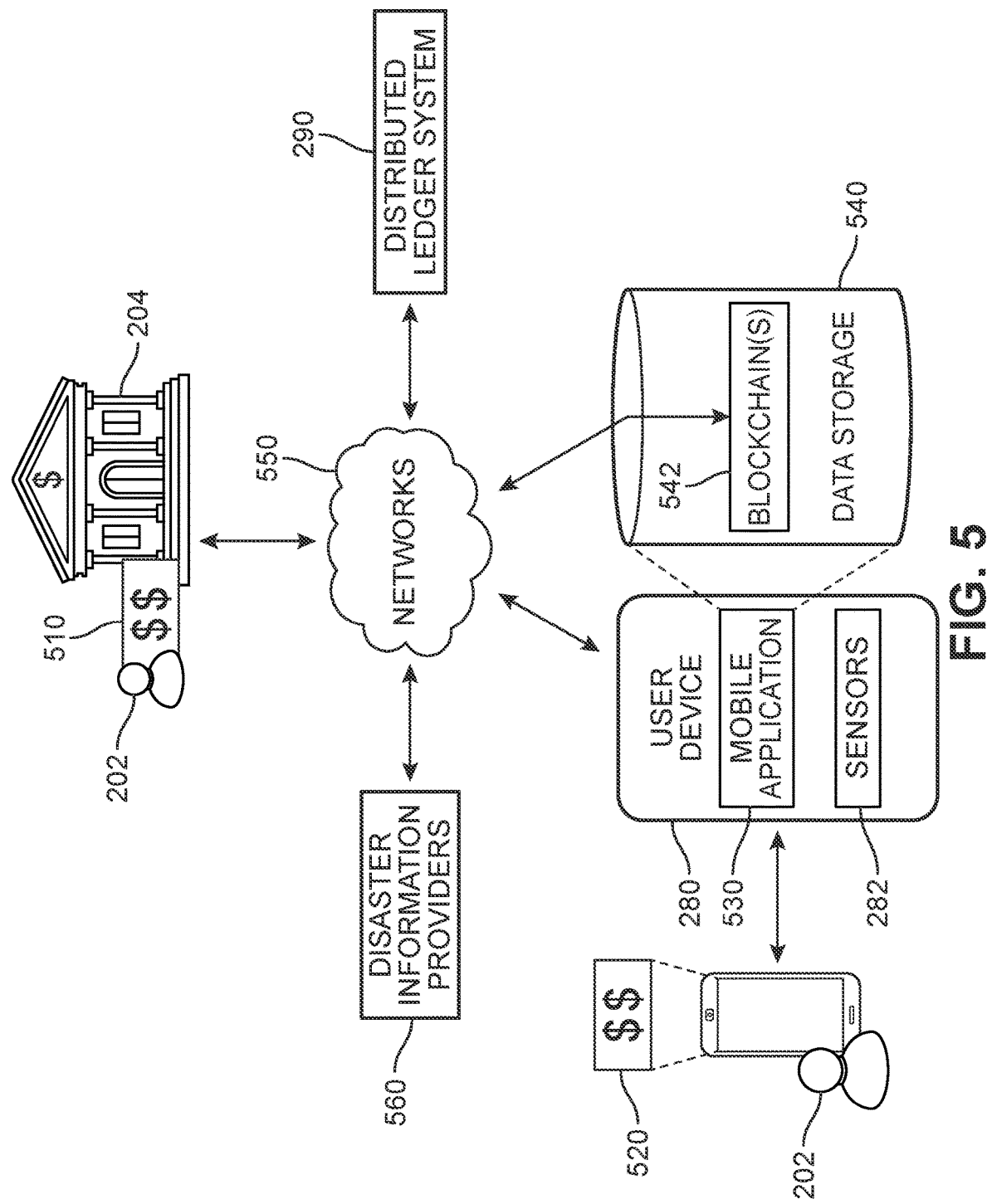
FIG. 5 is a schematic diagram illustrating an emergency response-triggered smart contract environment, according to an embodiment.

For purposes of clarity, FIG. 5 presents a schematic overview of one embodiment of the proposed systems. In this example, it can be seen that in some embodiments, when the distributed ledger system 290 receives information such as via oracles for disaster information providers 560 over network 550, the system 290 causes execution of a smart contract that releases a block of funds 510 and transfers the funds 510 to institutional system 204 of member 202. In addition, in another embodiment, when user device 280 (with or without connection to network 550) obtains real-time (live) data via sensors 282 indicative of a disaster, this data can be shared with a mobile application ("app") 530 associated with the insurer. In some embodiments, the app 530 includes data storage module 540 which stores a local version of the smart contract system. The app 530 can determine the conditions of the smart contract for the member 202 have been met and trigger an execution of the smart contract, releasing blockchain 542 as funds 520 via the user device 280.

For purposes of illustration, a schematic flow diagram of an embodiment of the second (local) process is depicted in FIG. 6. In the embodiment of FIG. 6, a local system 600 includes a plurality of sensor components ("sensors") 610 and a controller 650. Furthermore, while in some embodiments various modules and components of system 600 can be configured to connect to a network, it can be appreciated that the system 600 is able to function and execute smart contracts while offline. In other words, a user can rely on the system 600 as an independent, comprehensive system that is able to work in areas without a network or in situations where the user is unable to access any such connection.

In different embodiments, the sensors 610 can include one or more types of a component, device, module, machine, or subsystem whose purpose is to detect events or changes in its environment and convey the detected information to a sensor data processor 620. The user device running offline app services can include some or all of these sensor devices. As shown in FIG. 6, some non-limiting examples of such sensors include (a) Smoke, Gas and Alcohol (and/or other chemicals) sensors; (b) Temperature sensors; (c) Pressure sensors; (d) Cameras and other image and/or light sensors; (e) Smoke/Flame sensors; (f) Moisture/Humidity sensors; (g) Electrostatic sensors; (h) Audio sensors and other sound/volume sensors (e.g., microphones); (i) Motion/speed sensors; (j) Gyroscopes; (k) Accelerometers; (l) Wind Speed sensors; (m) Proximity sensors; (n) Infrared and Heat sensors; (o) Radio tuner; (p) G-force sensors; and/or (q) IoT network devices. In addition, in some embodiments, sensors 610 can include ultrasonic sensors, touch sensors, aerosol characterization sensors, magnetometers, color sensors, tilt sensors, and flow and level sensors. Thus, in different embodiments, sensors 610 may collect data regarding location, wind, heat/cold, precipitation, smoke, etc. around the user. Additionally, or alternatively, in some embodiments, the sensors 610 may be configured to collect atmospheric data, such as atmospheric temperature and/or atmospheric pressure. Monitoring such parameters may enable the system to detect dangerous weather conditions, such as storms, etc.

In some cases, sensors 610 can refer to one or more of a stationary internet of things (IoT) device(s) ("smart sensors") that communicate over a network. Smart sensors could comprise any of a variety of different IoT devices and other smart devices that may include one or more sensors. The smart sensors can be stationed at other locations in the area.

In different embodiments, data collected by sensors 610 can be used by the offline app services 680 to identify potential unsafe environmental conditions. In FIG. 6, data is transmitted to the sensor data processor 620 of controller 650 which prepares data for use by a local ledger 652. The data is used to determine, in conjunction with stored smart contract terms 654, whether the conditions have been met, thereby causing a release of funds 690. In some embodiments, this information may be used in conjunction with a navigation system, which includes a location data processor that can identify a user's current location and heading, for example via a GPS included in the system 600 and can collect data for the smart contract regarding the user's location.

One illustration of the proposed system is presented in FIG. 7, where a resident 710—an insured policy holder—is shown making their way through a flooded region 700. As the resident 710 wades through water 730, their mobile device 740 is held up above and automatically collects various types of sensor data from the environment. For example, image data may be obtained showing the submersion of a vehicle 720 in water 730, which can be used to determine severe flood conditions by the offline service app 680. In response, an alert 750 ("User emergency conditions detected") can be displayed. The data is processed by the app 680, which verifies the condition of the smart contract has been fulfilled 760 ("Authorizing release of emergency funds"), and can in some cases generate a payout validation code 770 that can be used by the resident 710 to obtain funds from a financial institution and/or local merchants.

Thus, in some embodiments, the offline device can be configured-via instructions from app 680—to generate a cryptographic element (code) including the amount of virtual currency that the insurance company (via the smart contract) is releasing as payout. The resident 710 obtains the cryptographic element which allows them to receive the virtual currency. The recipient can then view their funds in a virtual wallet. In one embodiment, the cryptographic element is a QR code. In another embodiment, the virtual currency can also be transmitted through infrared, sonic wave, or WIFI AD-HOC. It is noted that the transmission of the virtual currency is completely an offline transmission. In some embodiments, the cryptographic element comprises a private key, which in the context of Bitcoin is a secret number that allows the Bitcoins to be spent. Every Bitcoin address has a matching private key, which is saved in the virtual wallet file of the person who owns the balance. The private key is mathematically related to the Bitcoin address, and is designed so that the Bitcoin address can be calculated from the private key, but importantly, the same cannot be done in reverse. In other words, the private key is the "ticket" that allows someone to obtain and spend Bitcoins. In other words, the virtual ticket, obtained while offline, authorizes the resident 710 to spend the Bitcoins.

In some embodiments, the insured member can use the payout to make purchases even while remaining offline. For example, the user device can be configured to create a cryptographically signed digital check to the desired merchant's terminal using a short-range link (SRL), such as a peer-to-peer radio or other links through which the user device can communicate with another device.

In some embodiments, the proposed systems are further configured to collect information from the insured's device to determine if further review, and a subsequent adjuster examination of the damage, is necessary. The system may collect basic information from the insured's device that it is automatically stored in a loss data/module at the app's insurance claim processing module, which-when a network connection becomes available-will transmit documents for claims and associated the document with appropriate claim files to a (remote) central claim processing system. The documents stored in the loss data/module may be videos, photos, voice recordings, faxes and any of number of other reproducible media related to an insurance claim. In some embodiments, once a network connection is re-established, the insurance processing system and user device can perform an electronic handshake with the insurance claim processing system to update the appropriate records.

In some embodiments, the insurance claim processing system may provide a mobile device library or embeddable program that may be controlled in the mobile application on the insured's device. This library or embeddable program may be referred to as a "sensor widget". Any of a number of mobile device operating systems may be used to implement the mobile application and sensor widget, for example Apple iOS platform or the Android platform. The sensor widget may also provide real-time time and date, as well as GPS coordinates from the mobile device. The information may be encoded into the sensor data stream. Additional metadata that could be passed on in this manner might include insured name, insured policy number or identification number, telephone number for the insured, the device ID of the insured's mobile device, and so on.

In one embodiment, the sensor data is preferably generated at the insured's mobile device with some anti-fraud information that may be saved as part of the sensor data or as an appended metadata file and provided electronically to the remote claims processing system, verifying that the insured is at the property in question and that the data is current information rather than pre-recorded. In some embodiments, the application running on the insured's mobile device associated with the insurance claim processing system and provided previously to the insured by an earlier download, may preferably automatically tag the sensor data by integrating information into the video stream. In one embodiment, GPS information, for example a location or an orientation/bearing may also be included as part of the sensor data to provide anti-fraud information. Location information may be in any of a number of forms, for example a latitude and longitude format, a city and state format, or any of a number of location granularity formats. Using data from a member data database, the insurance claim processing system may determine if the GPS data, or other information received in the sensor data, matches the location information for the insured property (if the policy relates to a property insurance policy). If the information does not match, the insurance claim processing system may flag the session as potentially fraudulent, causing the system to flag the claim for a follow-up later.

Thus, as described herein, in contrast to a need for an insured party to engage in time-consuming and inconvenient—and in some cases inaccessible-communications with the insurer, the proposed embodiments streamline and expedite the claim payout to members who are in dire conditions, and for whom even small delays can mean lack of shelter, transportation, or sustenance. Rather than requiring an insurance representative to find the member's insurance account to see what the reimbursement limits and rules are and either prepare the estimate with a recommended payout, precious time is saved and any communication can be completely avoided. A distributed ledger such as a blockchain also provides for immutability of record storage and transparency into the stored information by the participants in the blockchain network. By providing for an interchange system in which settlement is performed in real time with respect to a transaction, implementations avoid the expenditure of processing capacity, storage, memory, network capacity, and/or other computing resources that traditional systems expend through the use of a batch settlement process. For example, because implementations perform settlement in real time, implementations avoid the use of storage space that would otherwise be used to store the transaction information until a later, batch settlement is performed. Moreover, because implementations provide an interchange system which substantially reduces the likelihood of fraudulent transactions, implementations avoid the expenditure of computing resources that traditional systems may expend to account for fraud and reverse the effects of fraudulent claim transactions.

In the figures depicted, different examples of a user interface ("interface") are presented on a touchscreen display of a mobile device, offering content via native controls included in the interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments (not shown in the drawings), the interface can include a welcome or header message(s), and/or a plurality of data input fields can also be presented. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

Figure 8:
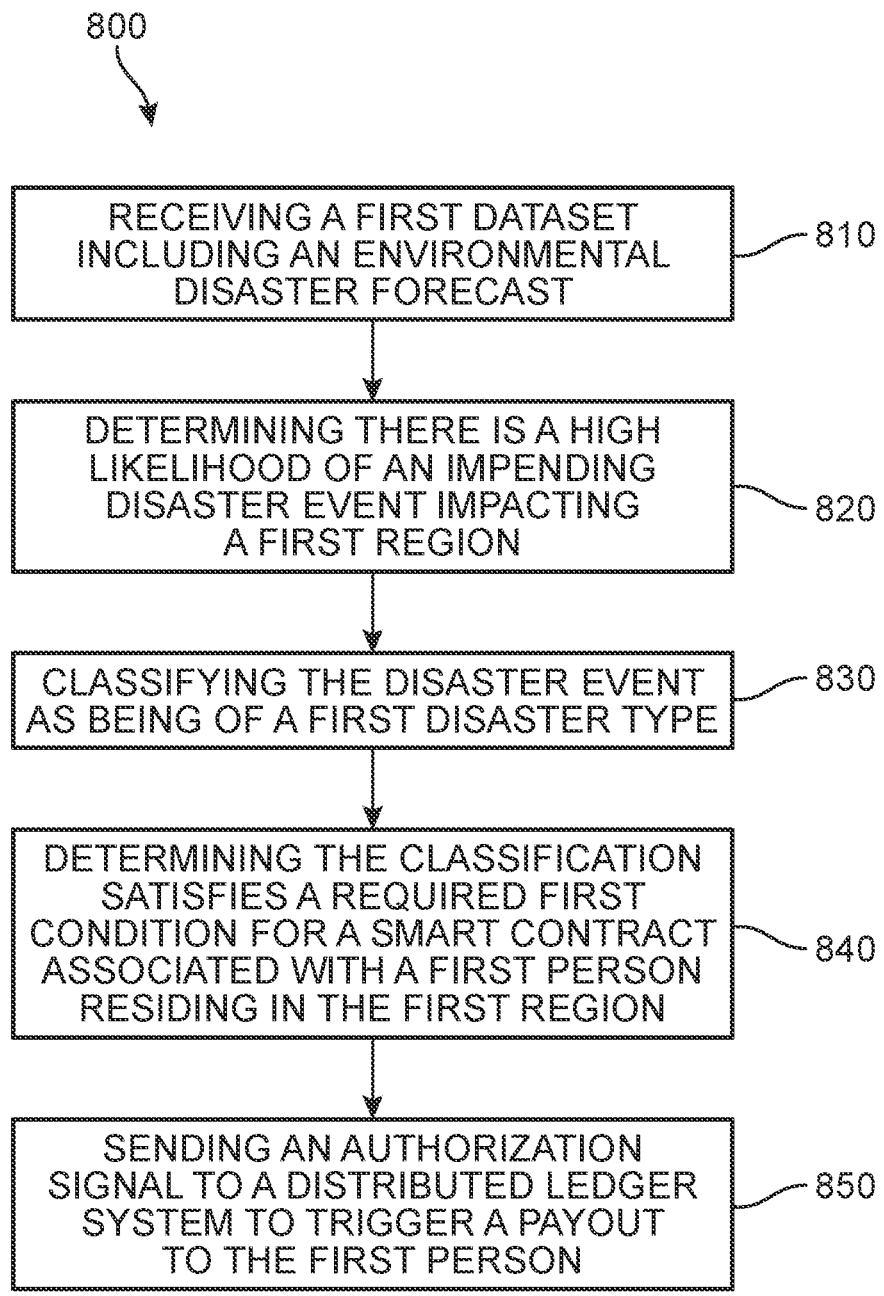
FIG. 8 is a flow chart depicting a process of triggering a payout to an insured member in response to a disaster event, according to an embodiment.

FIG. 8 is a flow chart illustrating an embodiment of a method 800 of releasing funds in response to emergency conditions. The method 800 includes a first step 810 of receiving, at a computing device, a first dataset including an environmental disaster forecast, and a second step 820 of determining, at the computing device and based on the first dataset, there is a high likelihood of an impending disaster event impacting a first region. For purposes of this disclosure, "impending" refers to an event that is predicted to occur within the next 7-10 days or sooner, and more commonly within the next 1-2 days. In addition, a disaster event refers broadly to an occurrence disrupting the normal conditions of existence and causing a level of suffering that exceeds the capacity of adjustment of the affected community, and/or that generate conditions of exposure, vulnerability, and hazard. A third step 830 includes classifying, at the computing device and based on the first dataset, the disaster event as being of a first disaster type, and a fourth step 840 includes determining, at the computing device, the classification satisfies a required first condition for a smart contract previously established on behalf of a first person residing in the first region. The method 800 further includes a fifth step 850 of sending, from the computing device and in response to the first condition being satisfied, an authorization signal to a distributed ledger system in which a predefined blockchain-based asset is managed, the signal triggering a payout of the asset to at least the first person residing in the first region.

In other embodiments, the method may include additional steps or aspects. In some embodiments, the first dataset is obtained from a national weather service for the country in which the first region is situated. In another embodiment, the first dataset is obtained from a user device associated with the first person. In yet another embodiment, the first dataset is obtained via crowdsourced weather data from devices located in the first region.

In some examples, the method includes additional steps of identifying, at the computing device, a predicted degree of severity of the disaster event based on the first dataset, determining, at the computing device, the predicted degree of severity falls above a pre-established threshold, and selecting, at the computing device, the smart contract based in part on the predicted degree of severity being above the pre-established threshold. In some embodiments, the payout is larger in cases in which the predicted degree of severity is above the pre-established threshold and smaller in cases in which the predicted degree of severity is below the pre-established threshold.

In one example, the asset is a type of cryptocurrency. In another example, the method also includes steps of receiving, at the computing device, payout factors including one or more of an insured value of any property in the first region owned by the first person, a distribution of insured persons in the first region, records of previous disaster events occurring in the first region, and a number and type of claims made by the first person prior to the disaster event, and determining, at the computing device, a payout amount based on the payout factors.

Other methods can also be contemplated within the scope of this disclosure. For example, a method of releasing funds in response to emergency conditions is also disclosed, including a first step of receiving, at a first application running on a computing device for a first user, sensor data indicating the computing device is in a location in which a disaster event has recently occurred, and a second step of classifying, at the first application and based on the sensor data, the disaster event as being of a first disaster type. A third step includes determining, at the first application, that the classification satisfies a required first condition for a smart contract previously established on behalf of the first user, and a fourth step includes authorizing, via the first application and in response to the first condition being satisfied, a first payout to the first user via a distributed ledger system in which predefined blockchain-based funds are managed.

In other embodiments, the method may include additional steps or aspects. In one example, the first application is configured to cause the distributed ledger system to release the first payout while the computing device is offline. In different embodiments, the sensor data includes one or more of image data, audio data, accelerometer data, G-force data, and temperature data. In some embodiments, the method also includes steps of determining, by the first application and prior to receiving the sensor data, updated information is available from a remote cloud server regarding an insurance policy associated with the first user, and downloading, at the computing device, the updated information such that the information is available locally on the computing device.

In another example, the updated information further includes a list of the most recent terms and conditions for the smart contract. In one embodiment, an access code for the first payout is generated offline via the first application, and the access code can be used to access cryptocurrency funds and/or perform transactions at merchants offering cryptocurrency payment gateways.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of releasing funds in response to emergency conditions, the method comprising:
   generating a first smart contract that preauthorizes a payment to a first user based on detection of a predefined emergency in a first geographic location;
   receiving, at a disaster prediction model for a first application running on a computing device for the first user that is in the first geographic location, sensor data indicating a disaster event has recently occurred in the first geographic location;
   determining, at the first application and based on the sensor data, that the disaster event corresponds to the predefined emergency;
   automatically authorizing via the first application, based on the first smart contract and in response to the disaster event corresponding to the predefined emergency, a first payout to the first user via a distributed ledger system in which predefined blockchain-based funds are managed; and
   wherein the sensor data includes crowdsourced weather data obtained via a crowdsourced decentralized weather provider oracle from smartphone devices located in the first geographic location.

2. The method of claim 1, wherein the first application is configured to cause the distributed ledger system to release the first payout while the computing device is offline.

3. The method of claim 1, wherein the sensor data includes one or more of weather data, image data, audio data, accelerometer data, G-force data, and temperature data.

4. The method of claim 1, further comprising:
   determining, by the first application and prior to receiving the sensor data, updated information is available from a remote cloud server regarding an insurance policy associated with the first user; and
   downloading, at the computing device, the updated information such that the information is available locally on the computing device.

5. The method of claim 4, wherein the updated information further includes a list of the most recent terms and conditions for the smart contract.

6. The method of claim 5, wherein the list includes one or more of a type of insurance policy associated with the first user, density of insured persons in a region that includes the first geographic location, property values in the region, the type of loss expected based on disaster type, and degree of loss based on collected user device data.

7. The method of claim 1, wherein an access code for the first payout is generated offline via the first application, and the access code can be used to perform transactions at merchants offering cryptocurrency payment gateways.

8. The method of claim 1, wherein the predefined emergency is one of a hurricane, tornado, flood, drought, volcanic eruption, earthquake, storm, wildfire, terrorist attack, and act of war.

9. The method of claim 1, wherein the sensor data is collected by sensors included in the computing device.

10. The method of claim 1, wherein the sensor data is further obtained from a national weather service for the country in which the first geographic location is situated.

11. The method of claim 1, wherein the first smart contract includes an order to trigger the release of a first block if the crowdsourced weather data matches its specifications.

12. A system for releasing funds in response to emergency conditions, the system comprising a processor and machine-readable media including instructions which, when executed by the processor, cause the processor to:
   generate a first smart contract that preauthorizes a payment to a first user based on detection of a predefined emergency in a first geographic location;
   receive, at a disaster prediction model for a first application running on a computing device for the first user that is in the first geographic location, sensor data indicating a disaster event has recently occurred in the first geographic location;
   determine, at the first application and based on the sensor data, that the disaster event corresponds to the predefined emergency;
   automatically authorize via the first application, based on the first smart contract and in response to the disaster event corresponding to the predefined emergency, a first payout to the first user via a distributed ledger system in which predefined blockchain-based funds are managed; and
   wherein the sensor data includes crowdsourced weather data obtained via a crowdsourced decentralized weather provider oracle from smartphone devices located in the first geographic location.

13. The system of claim 12, wherein the first application is configured to cause the distributed ledger system to release the first payout while the computing device is offline.

14. The system of claim 12, wherein the instructions further cause the processor to:
   determine, by the first application and prior to receiving the sensor data, updated information is available from a remote cloud server regarding an insurance policy associated with the first user; and
   download, at the computing device, the updated information such that the information is available locally on the computing device.

15. The system of claim 14, wherein the updated information further includes a list of the most recent terms and conditions for the smart contract.

16. The system of claim 15, wherein the list includes one or more of a type of insurance policy associated with the first user, density of insured persons in a region that includes the first geographic location, property values in the region, the type of loss expected based on disaster type, and degree of loss based on collected user device data.

17. The system of claim 12, wherein the sensor data includes one or more of weather data, image data, audio data, accelerometer data, G-force data, and temperature data.

18. The system of claim 12, wherein an access code for the first payout is generated offline via the first application, and the access code can be used to perform transactions at merchants offering cryptocurrency payment gateways.

19. The system of claim 12, wherein the predefined emergency is one of a hurricane, tornado, flood, drought, volcanic eruption, earthquake, storm, wildfire, terrorist attack, and act of war.

20. The system of claim 12, wherein the sensor data is further obtained from one of from a national weather service for the country in which the first geographic location is situated.

* * * * *